(12) United States Patent
Lee et al.

(10) Patent No.: US 12,026,181 B2
(45) Date of Patent: Jul. 2, 2024

(54) NETWORK ENVIRONMENT SYNCHRONIZATION APPARATUS AND METHOD

(71) Applicant: ELECTRONICS AND TELECOMMUNICATIONS RESEARCH INSTITUTE, Daejeon (KR)

(72) Inventors: Joo-Young Lee, Daejeon (KR); Ki-Jong Koo, Daejeon (KR); Ik-Kyun Kim, Daejeon (KR); Dae-Sung Moon, Daejeon (KR); Kyung-Min Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1 day.

(21) Appl. No.: 17/552,328

(22) Filed: Dec. 15, 2021

(65) Prior Publication Data

US 2022/0188339 A1     Jun. 16, 2022

(30) Foreign Application Priority Data

Dec. 16, 2020   (KR) ........................ 10-2020-0176160

(51) Int. Cl.
  *G06F 16/00*      (2019.01)
  *G06F 16/22*      (2019.01)
  *G06F 16/29*      (2019.01)
(52) U.S. Cl.
  CPC .......... *G06F 16/29* (2019.01); *G06F 16/2246* (2019.01); *G06F 16/2255* (2019.01)

(58) Field of Classification Search
  None
  See application file for complete search history.

(56) References Cited

U.S. PATENT DOCUMENTS

| 6,792,436 | B1 * | 9/2004 | Zhu ..................... G06F 16/9574 |
| | | | 707/999.203 |
| 7,013,311 | B2 * | 3/2006 | Hui ......................... G06F 16/83 |
| | | | 707/999.102 |

(Continued)

FOREIGN PATENT DOCUMENTS

| CN | 1766886 A | * | 5/2006 | ....... G06F 17/30327 |
| CN | 103514250 A | * | 1/2014 | ........... G06F 16/215 |

(Continued)

*Primary Examiner* — Jean M Corrielus
(74) *Attorney, Agent, or Firm* — Rabin & Berdo, P.C.

(57) ABSTRACT

Disclosed herein are a network environment synchronization apparatus and method. The network environment synchronization apparatus includes one or more processors, and execution memory for storing at least one program that is executed by the one or more processors, wherein the at least one program is configured to collect data from a network environment and generate a management structure in which collected data is distributed into preset respective group units, generate data discriminators for respective group units using a preset hash function, determine whether data of the management structure has changed with reference to data newly collected from the network environment based on the data discriminators, and when it is determined whether data of the management structure has changed, update the data of the management structure with the newly collected data.

7 Claims, 8 Drawing Sheets

(56) References Cited

U.S. PATENT DOCUMENTS

| | | | |
|---|---|---|---|
| 7,305,420 B2* | 12/2007 | Mathias | H04L 67/1095 |
| 8,150,318 B2 | 4/2012 | Moon et al. | |
| 8,977,660 B1* | 3/2015 | Xin | H04N 21/23103 |
| | | | 707/827 |
| 10,581,849 B2 | 3/2020 | Yoo | |
| 10,891,304 B2* | 1/2021 | Mehta | G06F 16/2379 |
| 11,030,175 B2* | 6/2021 | Lu | G06F 16/214 |
| 11,200,353 B2* | 12/2021 | Lachinski | G06F 16/29 |
| 2006/0036627 A1* | 2/2006 | Deran | G06F 16/2246 |
| 2008/0109395 A1* | 5/2008 | Loeb | G06F 16/2255 |
| 2009/0070354 A1* | 3/2009 | Chellapilla | H04L 9/3247 |
| 2013/0198251 A1* | 8/2013 | Nishida | G06F 16/2272 |
| | | | 707/830 |
| 2014/0047309 A1 | 2/2014 | Kim et al. | |
| 2015/0381419 A1* | 12/2015 | Kumar | G06Q 10/06 |
| | | | 709/224 |
| 2016/0103858 A1* | 4/2016 | Katz | G06F 16/9027 |
| | | | 707/797 |
| 2017/0060924 A1* | 3/2017 | Fitzhardinge | H04L 67/1095 |
| 2018/0144031 A1* | 5/2018 | Lavelle | G06F 16/24564 |
| 2019/0311057 A1* | 10/2019 | Sung | G06F 16/24542 |
| 2020/0202049 A1* | 6/2020 | Lachinski | G06T 17/20 |
| 2020/0202617 A1* | 6/2020 | Lachinski | H04N 13/204 |
| 2020/0285634 A1* | 9/2020 | Jho | H04L 9/50 |
| 2020/0295919 A1 | 9/2020 | Covaci et al. | |
| 2020/0344061 A1* | 10/2020 | Hwang | G06F 16/2246 |
| 2020/0379752 A1* | 12/2020 | Rodrigues Rosa Junior | |
| | | | G06F 16/9014 |
| 2020/0394177 A1* | 12/2020 | Maurer | G06F 9/45508 |

FOREIGN PATENT DOCUMENTS

| | | | | |
|---|---|---|---|---|
| CN | 114969061 A | * | 8/2022 | |
| EP | 3790224 A1 | * | 3/2021 | G06F 16/214 |
| KR | 101060615 B1 | | 8/2011 | |
| KR | 101831604 B1 | | 4/2018 | |
| KR | 1020190028880 A | | 3/2019 | |
| KR | 1020200081391 A | | 7/2020 | |

* cited by examiner

| HASH INDEX | DATA |
|---|---|
| $M_1$ | $d_1$ |
| $M_2$ | $d_2$ |
| $M_3$ | $d_3$ |
| ... | ... |
|  |  |
|  |  |

FIG. 4

NETWORK ENVIRONMENT SYNCHRONIZATION APPARATUS AND METHOD

CROSS REFERENCE TO RELATED APPLICATION

This application claims the benefit of Korean Patent Application No. 10-2020-0176160, filed Dec. 16, 2020, which is hereby incorporated by reference in its entirety into this application.

BACKGROUND OF THE INVENTION

1. Technical Field

The present invention relates generally to technology for configuring a network environment, and more particularly to technology for collecting data in a network environment and synchronizing network environments by incorporating a dynamically varying network environment into a virtual network environment.

2. Description of the Related Art

Evaluation of the security of an organization needs to be performed on an actual network environment in order to obtain accurate results. However, there is a disadvantage in that a security evaluation process such as a penetration test may influence important services and systems. One solution therefor is to construct a virtual network environment identical to the actual network environment and perform security evaluation on the virtual network environment. Through this security evaluation, security vulnerabilities may be identified, and security enhancement strategies may be established.

With regard to such a security evaluation method, an organization network environment continuously changes in such a way that various kinds of mobile devices frequently join an organization network, various types of software are newly installed in hosts, deleted therefrom, or patched, or new services are launched. Thus, there is a need to synchronize such an organization network environment with a virtual environment, generated by continuously considering the dynamically changing network environment.

To solve the synchronization problem, all virtual environments may be newly constructed using collected data, but there is a high probability that a portion in which a difference occurs between the data newly collected from the actual environment and data in a previously constructed virtual environment will be smaller than a portion in which the pieces of data are identical to each other. Further, the shorter the length of the cycle at which data is collected, the smaller the portion in which a difference occurs. Therefore, a method for identifying only differences between the virtual environment and the actual environment and updating the corresponding elements, rather than a method for completely reconfiguring a previously constructed virtual environment, may be a more efficient synchronization method.

Meanwhile, Korean Patent Application Publication No. 10-2020-0081391, entitled "Computer-Implemented Systems and Methods for Linking a Blockchain to a Set of Digital Twins" discloses a computer-implemented method and storage system, which uses blockchain technology as a storage system for data acquired from a set of digital twins using a blockchain, wherein the blockchain can be used to generate an immutable transaction history of data produced by the set of digital twins.

SUMMARY OF THE INVENTION

Accordingly, the present invention has been made keeping in mind the above problems occurring in the prior art, and an object of the present invention is to efficiently synchronize a virtual network environment with an actual network environment when configuring a virtual network environment using data collected in the actual network environment.

Another object of the present invention is to identify a difference between an existing network environment and a current network environment, promptly detect a change occurring on the network, check the trend in the change, and then provide assistance in security control.

In accordance with an aspect of the present invention to accomplish the above objects, there is provided a network environment synchronization apparatus, including one or more processors, and execution memory for storing at least one program that is executed by the one or more processors, wherein the at least one program is configured to collect data from a network environment and generate a management structure in which collected data is distributed into preset respective group units, generate data discriminators for respective group units using a preset hash function, determine whether data of the management structure has changed with reference to data newly collected from the network environment based on the data discriminators, and when it is determined whether data of the management structure has changed, update the data of the management structure with the newly collected data.

The at least one program may be configured to generate the management structure into a hierarchical tree structure that is hierarchically organized depending on a preset parent-child relationship for respective group units.

The at least one program is configured to hierarchically organize parent-child relationships between hashes generated for respective group units depending on the hierarchical tree structure.

The at least one program may be configured to generate a hash chain using hashes generated from pieces of data for respective group units, and generate the data discriminators from the hash chain.

The at least one program may be configured to generate a data discriminator of the newly collected data, compare hashes of a data discriminator of the management structure corresponding to the data discriminator of the newly collected data with hashes of the data discriminator of the newly collected data with regard to whether the hashes match each other, and then determine whether the data of the management structure has changed.

The at least one program may be configured to compare the hashes included in the data discriminator of the newly collected data with the hashes included in the data discriminator of the management structure with regard to whether the hashes match each other, using a depth-first-search technique depending on the hierarchical tree structure.

The at least one program may be configured to generate a first bloom filter for the hashes included in the data discriminator of the newly collected data, generate a second bloom filter for the hashes included in the data discriminator of the management structure, and determine whether the data of the management structure has changed by comparing the first bloom filter with the second bloom filter.

In accordance with another aspect of the present invention to accomplish the above objects, there is provided a network environment synchronization method performed by a network environment synchronization apparatus, the network environment synchronization method including collecting data from a network environment and generating a management structure in which collected data is distributed into preset respective group units, generating data discriminators for respective group units using a preset hash function, determining whether data of the management structure has changed with reference to data newly collected from the network environment based on the data discriminators, and when it is determined whether data of the management structure has changed, updating the data of the management structure with the newly collected data.

Generating the management structure may include generating the management structure into a hierarchical tree structure that is hierarchically organized depending on a preset parent-child relationship for respective group units.

Generating the data discriminators may include hierarchically organizing a parent-child relationship between hashes generated for respective group units depending on the hierarchical tree structure.

Generating the data discriminators may further include generating a hash chain using hashes generated from pieces of data for respective group units, and generating the data discriminators from the hash chain.

Determining whether data of the management structure has changed may include generating a data discriminator of the newly collected data, comparing hashes of a data discriminator of the management structure corresponding to the data discriminator of the newly collected data with hashes of the data discriminator of the newly collected data with regard to whether the hashes match each other, and then determining whether the data of the management structure has changed.

Determining whether data of the management structure has changed may further include comparing the hashes included in the data discriminator of the newly collected data with the hashes included in the data discriminator of the management structure with regard to whether the hashes match each other, using a depth-first-search technique depending on the hierarchical tree structure.

Determining whether data of the management structure has changed may further include generating a first bloom filter for the hashes included in the data discriminator of the newly collected data, generating a second bloom filter for the hashes included in the data discriminator of the management structure, and determining whether the data of the management structure has changed by comparing the first bloom filter with the second bloom filter.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram illustrating a data storage hash table according to an embodiment of the present invention;

DESCRIPTION OF THE PREFERRED EMBODIMENTS

Figure 1:
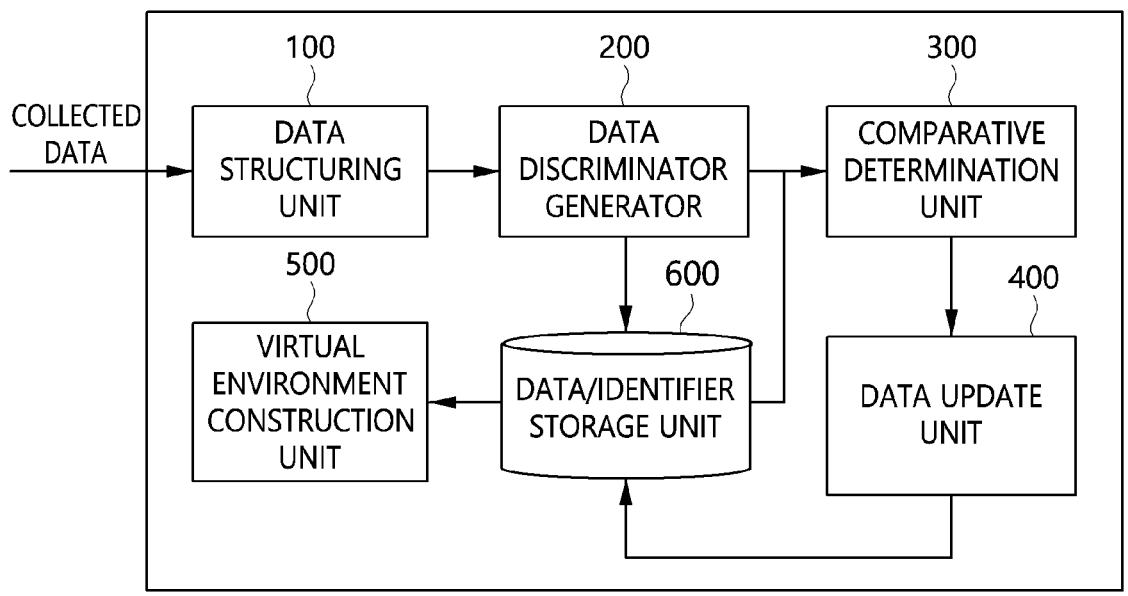
FIG. 1 is a block diagram illustrating a network environment synchronization apparatus according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, preferred embodiments of the present invention will be described in detail with reference to the attached drawings.

Figure 2:
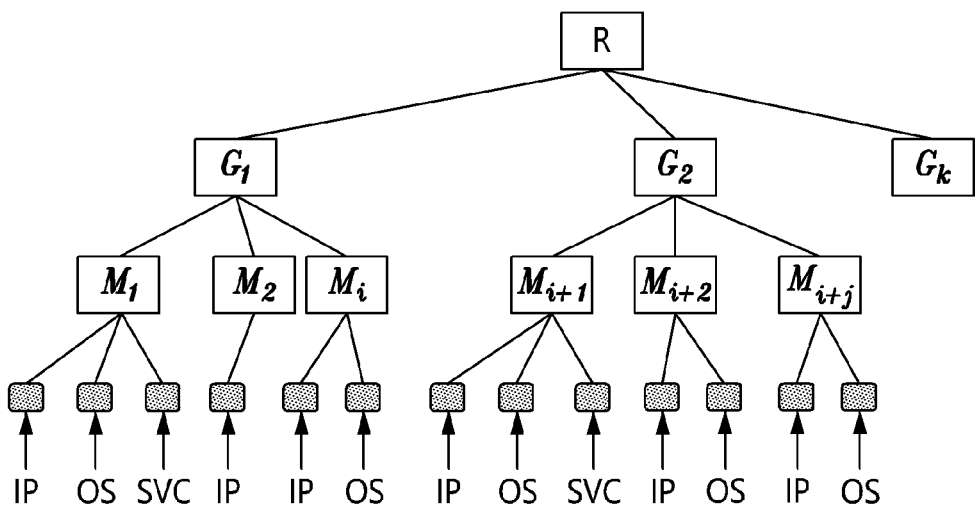
FIG. 2 is a diagram illustrating hierarchical structuring of collected data according to an embodiment of the present invention.
Figure 3:
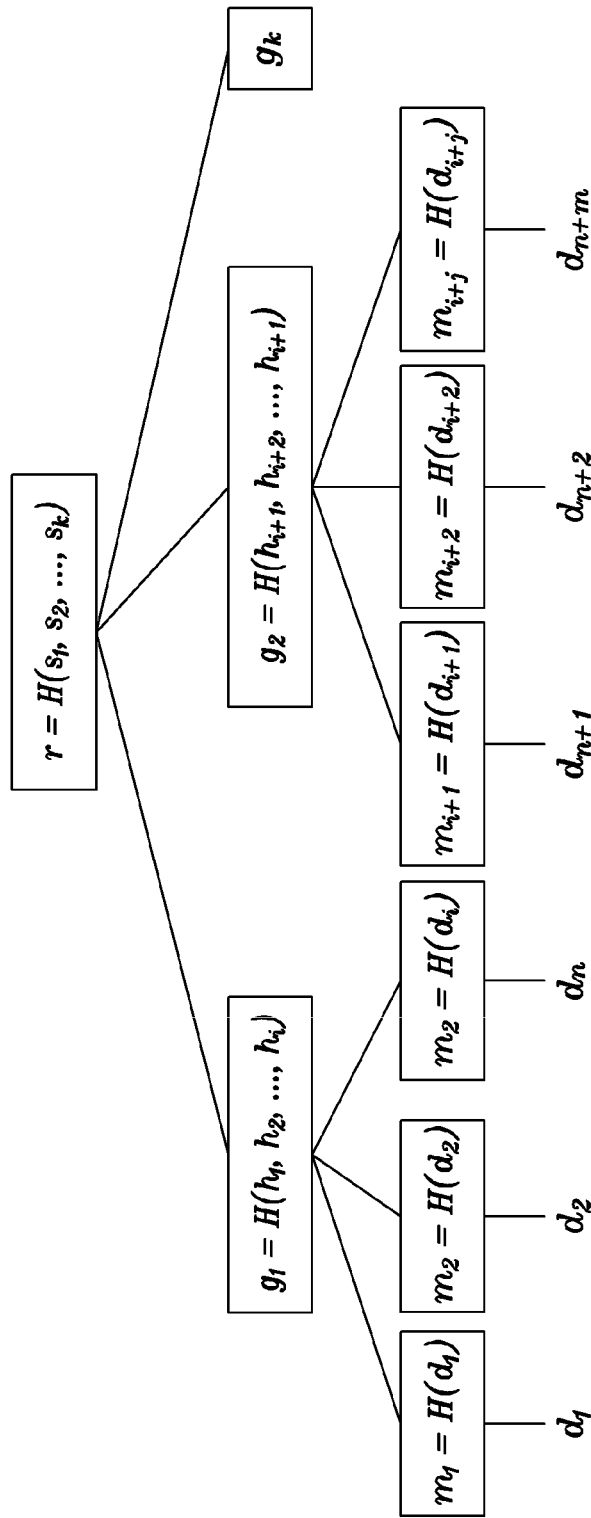
FIG. 3 is a diagram illustrating a process for generating a hierarchically structured data discriminator according to an embodiment of the present invention.
Figure 4:
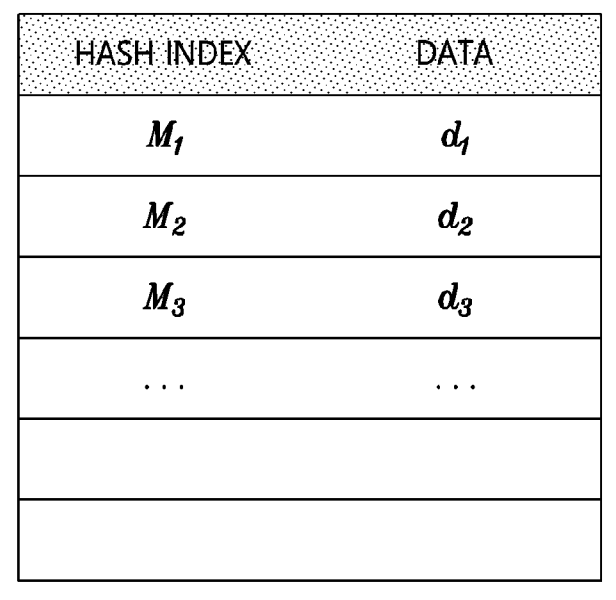

FIG. 1 is a block diagram illustrating a network environment synchronization apparatus according to an embodiment of the present invention. FIG. 2 is a diagram illustrating hierarchical structuring of collected data according to an embodiment of the present invention. FIG. 3 is a diagram illustrating a process for generating a hierarchically structured data discriminator according to an embodiment of the present invention. FIG. 4 is a diagram illustrating a data storage hash table according to an embodiment of the present invention.

Referring to FIG. 1, a network environment synchronization apparatus according to an embodiment of the present invention includes a data structuring unit 100, a data discriminator generator 200, a comparative determination unit 300, a data update unit 400, a virtual environment construction unit 500, and a data/identifier storage unit 600.

The data structuring unit 100 may collect data from a network environment, and may generate a management structure in which the collected data is distributed into preset group units.

In this case, the data structuring unit 100 may select a member as a basic unit based on which the collected data is to be processed and structured.

The present invention exemplifies an individual host as the basic member, but the present invention is not limited thereto. When a host is selected as a unit member, data of the member may include an operating system (OS) operation service execution process, network and security function setting information, etc. of the host, which are collected from an actual network environment.

Here, the data structuring unit 100 may generate the management structure as a hierarchical tree structure that is hierarchically organized depending on preset parent-child (hierarchical) relationships for respective group units.

Here, the data structuring unit 100 may form unit groups by combining multiple members into each group. Although a subnet is described as an example of a unit group in the present invention, the present invention is not limited thereto.

Here, when the data structuring unit 100 selects a subnet as a unit group, hosts included in the corresponding subnet may be included in the unit group. In addition, the groups may be configured in conformity with various policies for networks and security management, such as the provision of a mission critical service for an internal organization structure.

Here, the data structuring unit 100 may merge multiple unit groups into one upper-level group, and may form groups higher than respective upper-level groups depending on the preset parent-child relationships.

In this case, the data structuring unit 100 may finally generate a hierarchical data management structure that is hierarchically organized into a single tree structure by repeating the above-process.

Referring to FIG. 2, it can be seen that the hierarchical management structure generated by the data structuring unit 100 is illustrated.

The data discriminator generator 200 may generate data discriminators (data indices) for respective group units using a preset hash function.

Here, the data discriminator generator 200 may hierarchically organize the parent-child relationship between hashes generated for respective group units depending on the hierarchical tree structure.

Here, the data discriminator generator 200 may generate a hash chain using the hashes generated from pieces of data for respective group units, and may generate the data discriminators from the hash chain.

Here, the data discriminator generator 200 may generate discriminators of members and groups using a hash function. The type and number of hash functions used in the present invention are not especially limited.

Here, the data discriminator generator 200 may generate hashes (i.e., hash values) for pieces of data of respective members as the discriminators for respective members.

Here, the data discriminator generator 200 may hash pieces of data, obtained by allowing the data structuring unit 100 to process pieces of data collected from the actual network environment in a normalized format.

When a host is designated as a member, the data discriminator generator 200 may use, as the input of the hash function, structured data related to an operating system (OS) operation service execution process, network and security function setting information, etc. of the host.

Here, the data discriminator generator 200 may generate the hash chain using the hashes of members included in each unit group as the discriminator of the corresponding unit group.

When a subnet is designated as a unit group, the data discriminator generator 200 may use a hash value, obtained by hashing pieces of normalized data of respective hosts, as the input required to generate the hash of the corresponding unit group.

Here, when there is a group higher than the unit group, the data discriminator generator 200 may generate a hash chain using the hashes of unit groups included in the upper-level group.

In this case, the data discriminator generator 200 may finally generate a single hash for all pieces of data collected from the actual network environment by repeating the above-described process, and may hierarchically organize the hashes, generated in this process, into a single tree structure.

Referring to FIG. 3, it can be seen that an example of a hash tree discriminator (hash index), generated by the data discriminator generator 200, with regard to the hierarchical management structure generated by the data structuring unit 100, is depicted.

Referring to FIG. 4, an example of a hash table indicating data corresponding to the hash tree discriminator (hash index) generated by the data discriminator generator 200, as illustrated in FIG. 3 is depicted.

Further, the data discriminator generator 200 may check whether there is target data to be compared (i.e., comparison target data).

Here, the data discriminator generator 200 may generate a data discriminator for newly collected data, and may check whether a data discriminator identical to the generated data discriminator is present among data discriminators of previously collected data.

When no data discriminator identical to the generated data discriminator is present among the data discriminators, the data discriminator generator 200 may store the newly collected data, whereas when a data discriminator identical to the generated data discriminator is present, the comparative determination unit 300 may determine whether any member in the corresponding group has changed.

The data discriminator generator 200 may store the newly collected data in a hash table.

The data discriminator generator 200 may store the newly collected data in the data/identifier storage unit 600.

In this case, the data discriminator generator 200 may set the data discriminator of the newly collected data as a hash index, and may record and store data corresponding to the hash index in the hash table.

The comparative determination unit 300 may be configured to, when a data discriminator identical to that of the newly collected data is present among the pieces of previously collected data (old data), determine based on the data discriminator whether data of the management structure has changed with reference to the data newly collected from the network environment.

Here, when the data discriminator of the newly collected data is generated by the data discriminator generator 200, the comparative determination unit 300 may compare hashes of data discriminators in the management structure, corresponding to the data discriminator of the newly collected data, with the hashes of the data discriminator of the newly collected data with regard to whether the hashes match each other, and may then determine whether the data of the management structure has changed.

In this case, the comparative determination unit 300 may determine whether any data in an existing member or any member in a group has changed by comparing the data discriminator $HT_{old}$ of the previous data (old data) with the data discriminator $HT_{new}$ of the newly collected data.

In this case, the comparative determination unit 300 may compare hashes included in the data discriminator of the newly collected data with hashes included in the data discriminator of the management structure with regard to whether the hashes match each other using a Depth-First-Search (DFS) technique depending on the hierarchical tree structure.

Here, the comparative determination unit 300 may search each configured hash tree (or Merkle tree) through the DFS technique.

The comparative determination unit 300 may fetch one node from each of $HT_{old}$ and $HT_{new}$, may determine whether the two hash values of the corresponding node match each other, and may mark the corresponding node with "visited node" when the two hash values match each other.

Here, if there is a remaining node to visit, the comparative determination unit 300 may fetch one node from each tree, may determine whether the corresponding node is a leaf node when the two hashes are different from each other, may again fetch one node from each tree when the corresponding node is not a leaf node, and may add the corresponding node to a difference list when the corresponding node is a leaf node.

In this case, the comparative determination unit 300 may finally identify data in which a change has occurred by repeating the above-described process, and may acquire a final change list when the tree search has been terminated.

Also, the comparative determination unit 300 may compare bloom filters for the conventional data (old data) and the new data with each other, and may then determine whether the corresponding data has changed.

Here, when newly collected data is input, the comparative determination unit 300 may generate bloom filters for data so as to check whether any data in an existing member has changed or whether any member in each group has changed.

Here, the comparative determination unit 300 may generate a first bloom filter for hashes included in the data discriminator of the newly collected data, generate a second bloom filter for hashes included in the data discriminator of the management structure, and then determine whether the data of the management structure has changed by comparing the first bloom filter with the second bloom filter.

Here, when a bloom filter is generated for each member, the comparative determination unit 300 may use the data of the corresponding member as the input of the bloom filter, whereas when one bloom filter is generated for each group, the comparative determination unit 300 may use the hash of each member as the input of the bloom filter.

Here, in order to compare a previous bloom filter and a new bloom filter in the same group with each other, the comparative determination unit 300 may perform a bitwise AND operation between the two filters, and may determine that there is no change in any member in the group when all bits of the resultant value are '1'.

Meanwhile, when one or more bits of the resultant value are '0', the comparative determination unit 300 may determine that there is a change in any member in the group.

The data update unit 400 may update the data of the management structure with the newly collected data when it is determined whether any data of the management structure has changed.

The data update unit 400 may identify the changed member based on the result of determination by the comparative determination unit 300 with regard to whether any member in the group has changed.

Here, the data update unit 400 may find a portion in which a change has occurred, and may first detect the changed member in the group so as to revise only the corresponding portion.

The data update unit 400 may identify a pair of nodes in which a change has occurred by utilizing the difference list based on the hash tree discriminator (hash index) generated by the data discriminator generator 200.

In this case, the data update unit 400 may update a hash table based on the list of the identified member.

Furthermore, when data is updated using the bloom filters, the data update unit 400 may determine whether a member in a new group is included in an existing group through a search using the bloom filters.

In this case, the data update unit 400 may generate a list of addition members determined not to be present in the existing group using the characteristic of the bloom filters in which false negatives do not occur.

In this case, the data update unit 400 may determine whether a member of an existing group is present in the bloom filter for the new group through a search so as to delete a member that is not present in the new group, and may maintain the corresponding member in a deletion member list.

The data update unit 400 may update the hash table using the identified addition member list and the deletion member list.

The virtual environment construction unit 500 may construct or update a virtual environment using the collected data.

The member to be updated in the existing virtual network environment may be reconfigured using the update list generated by the data update unit 400 and the hash table.

The data/identifier storage unit 600 may store the hash table, which has hashes for members as identifiers, as data about the members.

Figure 5:
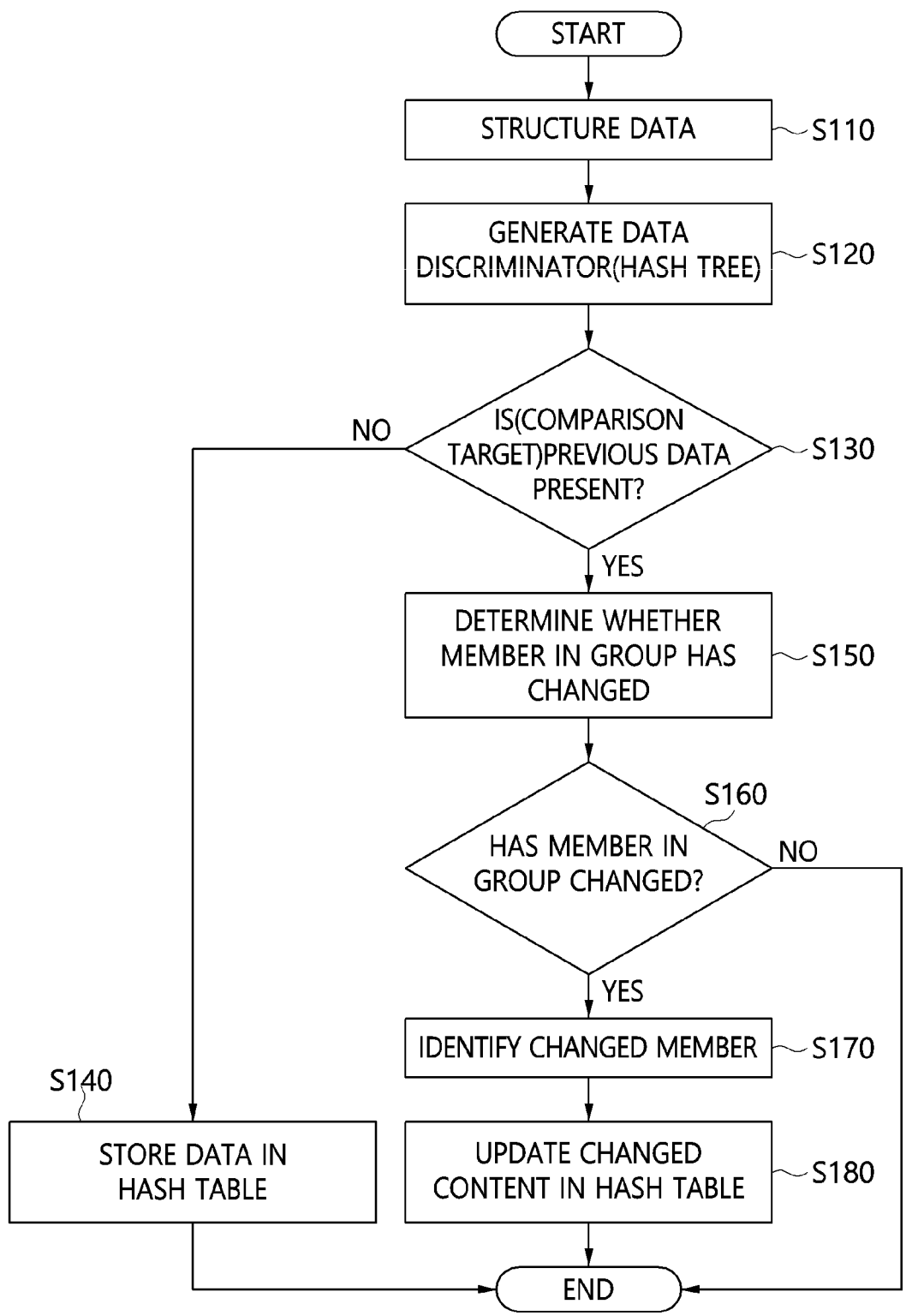
FIG. 5 is an operation flowchart illustrating a network environment synchronization method according to an embodiment of the present invention.
Figure 6:
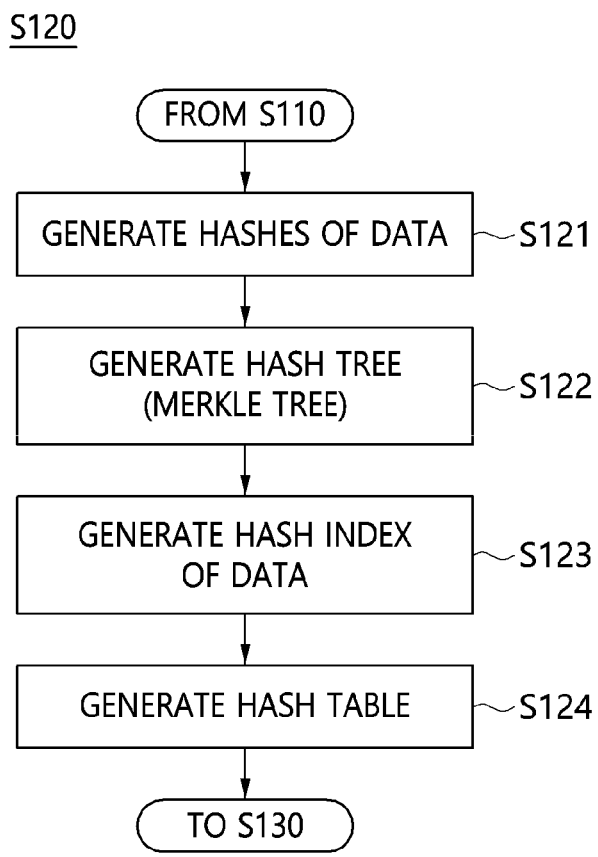
FIG. 6 is an operation flowchart illustrating in detail an example of the data discriminator generation step, illustrated in FIG. 5.
Figure 7:
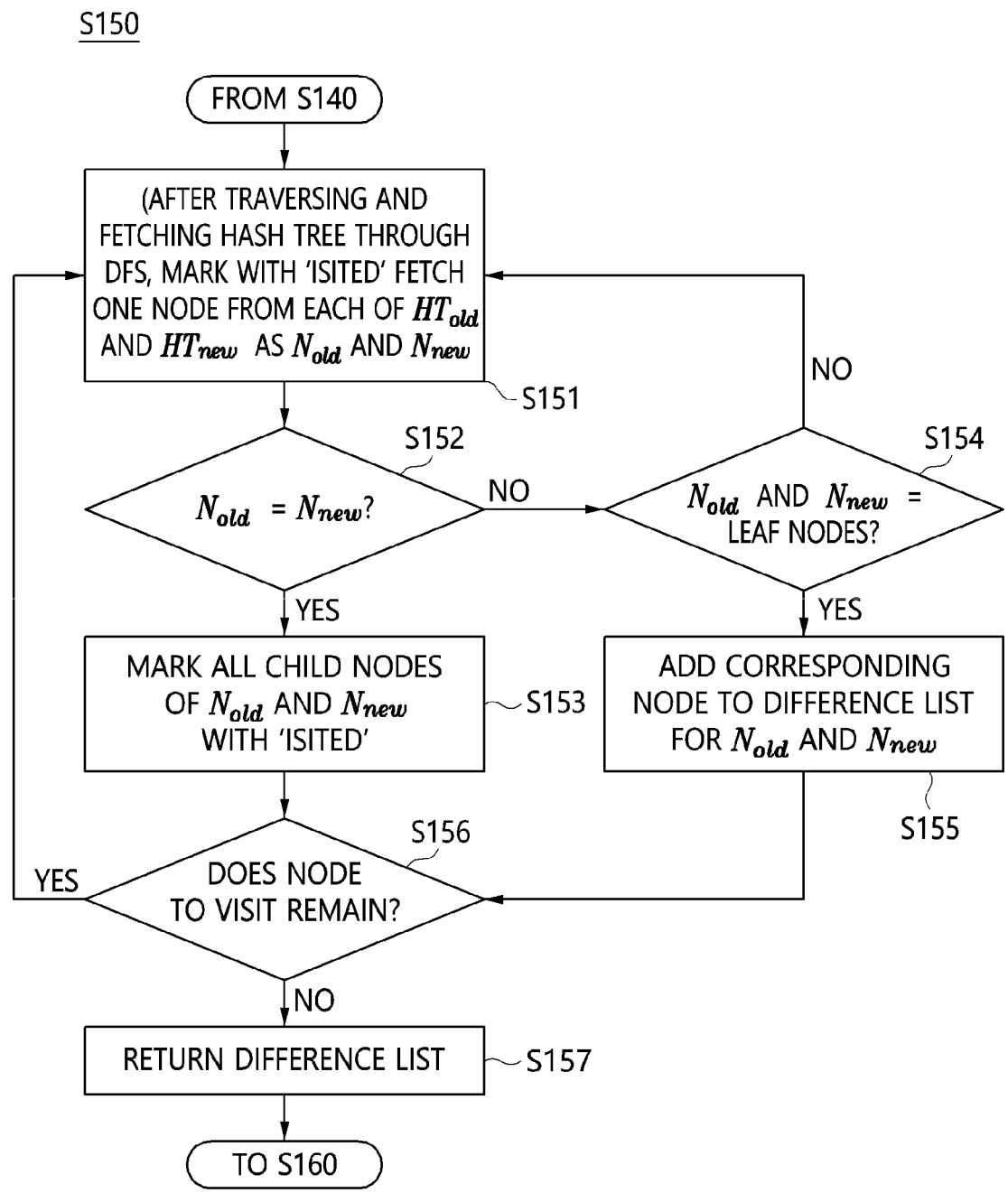
FIG. 7 is an operation flowchart illustrating in detail an example of the step of determining whether a member in a group has changed, as illustrated in FIG. 5.
Figure 8:
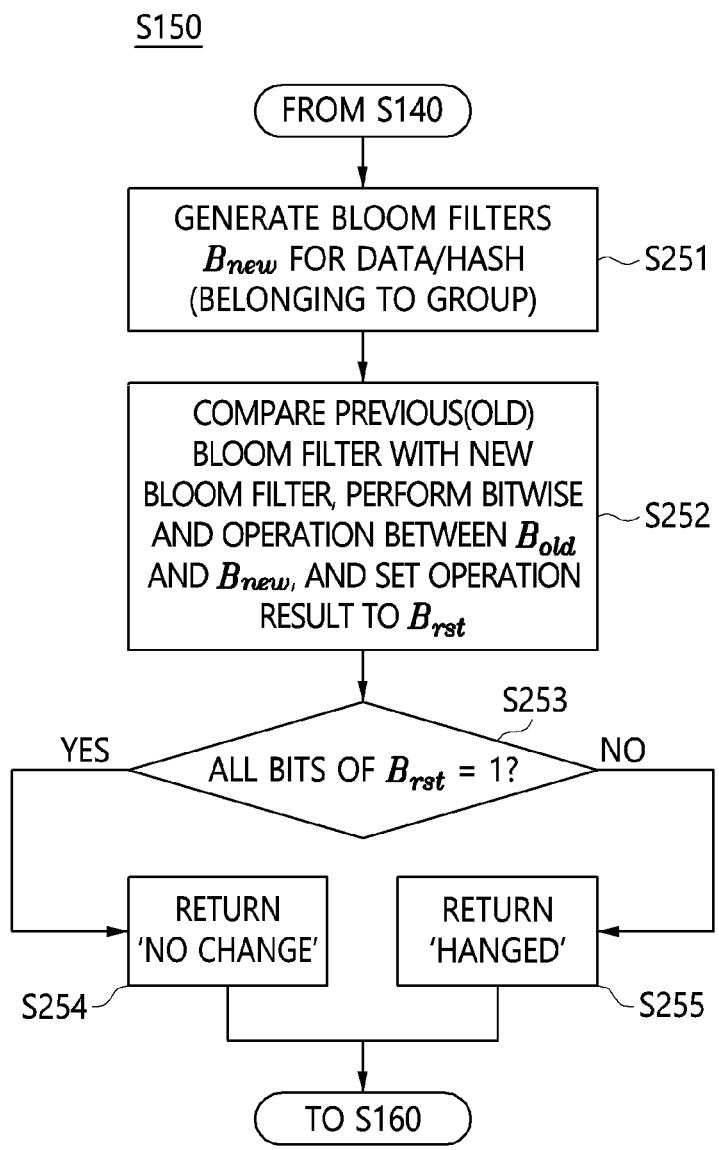
FIG. 8 is an operation flowchart illustrating in detail another example of the step of determining whether a member in a group has changed, as illustrated in FIG. 5.

FIG. 5 is an operation flowchart illustrating a network environment synchronization method according to an embodiment of the present invention. FIG. 6 is an operation flowchart illustrating in detail an example of the data discriminator generation step, illustrated in FIG. 5. FIG. 7 is an operation flowchart illustrating in detail an example of the step of determining whether a member in a group has changed, as illustrated in FIG. 5. FIG. 8 is an operation flowchart illustrating in detail another example of the step of determining whether a member in a group has changed, as illustrated in FIG. 5.

Referring to FIG. 5, the network environment synchronization method according to an embodiment of the present invention may structure data at step S110.

That is, at step S110, data may be collected from a network environment, and a management structure in which the collected data is distributed into preset group units may be generated.

Here, at step S110, a member may be selected as a basic unit based on which the collected data is to be processed and structured.

The present invention exemplifies an individual host as the basic member, but the present invention is not limited thereto. When a host is selected as a unit member, data of the member may include an operating system (OS) operation service execution process, network and security function setting information, etc. of the host, which are collected from an actual network environment.

At step S110, the management structure may be generated as a hierarchical tree structure that is hierarchically organized depending on preset parent-child relationships for respective group units.

Here, at step S110, groups may be formed by combining multiple members into each group. Although a subnet is described as an example of a unit group in the present invention, the present invention is not limited thereto.

At step S110, when a subnet is selected as a unit group, hosts included in the corresponding subnet may be included in the unit group. In addition, the groups may be configured in conformity with various policies for networks and security management, such as the provision of a mission-critical service for an internal organization structure.

Here, the data structuring unit 100 may merge multiple unit groups into one upper-level group, and may form upper-level groups above respective upper-level groups depending on the preset parent-child relationships.

Here, at step S110, a hierarchical data management structure that is hierarchically organized into a single tree structure may be finally generated by repeating the above-process.

Referring to FIG. 2, it can be seen that the hierarchical management structure generated by the data structuring unit 100 is illustrated.

Next, the network environment synchronization method according to an embodiment of the present invention may generate data discriminators at step S120.

That is, at step S120, the data discriminators may be generated for respective group units using a preset hash function.

Here, at step S120, the parent-child relationship between hashes generated for respective group units may be hierarchically organized depending on the hierarchical tree structure.

Here, at step S120, a hash chain may be generated using the hashes generated from pieces of data for respective group units, and the data discriminators may be generated from the hash chain.

Here, at step S120, discriminators of members and groups may be generated using a hash function. The type and number of hash functions used in the present invention are not especially limited.

Referring to FIG. 6, in the procedure at step S120, hashes of data may be generated at step S121.

That is, at step S121, hashes of pieces of data of respective members may be generated as discriminators (indices) for respective members.

Here, at step S121, pieces of data, obtained by allowing the data structuring unit 100 to process pieces of data collected from the actual network environment in a normalized format, may be hashed.

For example, at step S121, when a host is designated as a member, structured data related to an operating system (OS) operation service execution process, network and security function setting information, etc. of the host may be used as the input of the hash function.

Next, in the procedure at step S120, a hash tree may be generated at step S122.

That is, at step S122, a hash chain may be generated using the hashes of members included in each unit group as the discriminator of the corresponding unit group.

At step S122, when a subnet is designated as a unit group, a hash value, obtained by hashing pieces of normalized data of respective hosts, may be used as the input required to generate the hash of the corresponding unit group.

At step S122, when there is a group higher than the unit group, a hash chain may be generated using the hashes of unit groups included in the upper-level group.

At step S122, a single hash for all pieces of data collected from the actual network environment may be finally generated by repeating the above-described process, and the hashes, generated in this process, may be hierarchically organized into a single tree structure.

Next, in the procedure at step S120, a hash index may be generated at step S123.

That is, at step S123, as a discriminator for each unit group, a hash index may be generated from hashes of members included in the corresponding unit group.

Further, in the procedure at step S120, a hash table may be generated at step S124.

That is, at step S124, a hash table indicating a list of data corresponding to the hash index may be generated.

Referring to FIG. 3, it can be seen that an example of a hash tree discriminator (hash index), generated by the data discriminator generator 200, with regard to the hierarchical management structure, generated by the data structuring unit 100, as illustrated in FIG. 2, is depicted.

Referring to FIG. 4, an example of a hash table indicating data corresponding to the hash tree discriminator (hash index) generated by the data discriminator generator 200, as illustrated in FIG. 3, is depicted.

Next, the network environment synchronization method according to the embodiment of the present invention may determine whether there is target data to be compared (i.e., comparison target data) at step S130.

At step S130, a data discriminator for newly collected data may be generated, and it may be checked whether a data discriminator identical to the generated data discriminator is present among data discriminators of previously collected data.

Here, if it is determined at step S130 that identical data discriminator is not present, the newly collected data may be stored at step S140, whereas when identical data discriminator is present, it may be determined whether any member in the group has changed at step S150.

In detail, the network environment synchronization method according to the embodiment of the present invention may store the newly collected data in the hash table at step S140.

That is, at step S140, the newly collected data may be stored in the data/identifier storage unit 600.

Here, at step S140, the data discriminator of the newly collected data may be set as a hash index, and data corresponding to the hash index may be recorded and stored in the hash table.

The network environment synchronization method according to the embodiment of the present invention may determine whether any member in the group has changed at step S150.

That is, at step S150, when a data discriminator identical to that of the newly collected data is present among the pieces of previously collected data (old data), whether data of the management structure has changed with reference to the data newly collected from the network environment may be determined based on the data discriminator.

At step S150, hashes of the data discriminator of the newly collected data may be compared with hashes of the data discriminator in the management structure corresponding to the data discriminator of the newly collected data, with regard to whether the hashes match each other, and it may be determined whether the data of the management structure has changed.

Here, at step S150, it may be checked whether any data in an existing member or any member in a group has changed by comparing the data discriminator $HT_{old}$ of the previous data (old data) with the data discriminator $HT_{new}$ of the newly collected data.

Referring to FIG. 7, at step S150, hashes included in the data discriminator of the newly collected data may be compared with hashes included in the data discriminator of the management structure with regard to whether the hashes match each other using a Depth-First-Search (DFS) technique depending on the hierarchical tree structure.

Here, in the procedure at step S150, each configured hash tree may be searched through the DFS technique at step S151.

That is, in the procedure at step S151, one node may be fetched from each of $HT_{old}$ and $HT_{new}$, whether the two hash values of the corresponding node match each other may be determined at step S152, and when the two hash values match each other, the corresponding node may be marked with "visited node" at step S153.

Further, when two hashes are different from each other at step S152, whether the corresponding node is a leaf node may be determined at step S154. When the corresponding node is not a leaf node, one node may be fetched from each tree at step S151, whereas when the corresponding node is a leaf node, the corresponding node may be added to a difference list at step S155.

When any node to visit remains at step S156, one node may be fetched from each tree at step S151, whereas when no node to visit remains, the difference list may be output at step S157.

At step S150, data in which a change has occurred may be finally identified by repeating the above-described process, and a final change list may be acquired when the tree search has been terminated.

Furthermore, at step S150, bloom filters for previous data (old data) and new data may be compared with each other, and then whether a change has occurred in the data.

Referring to FIG. 8, in the procedure at step S150, when newly collected data is input, bloom filters for data may be generated so as to check whether any data in an existing member has changed or whether any member in each group has changed at step S251.

Further, in the procedure at step S150, a first bloom filter for hashes included in the data discriminator of the newly collected data may be generated, a second bloom filter for hashes included in the data discriminator of the management structure may be generated, and whether any data of the management structure has changed may be determined by comparing the first bloom filter with the second bloom filter at step S252.

In this case, at step S252, when a bloom filter is generated for each member, the data of the corresponding member may be used as the input of the bloom filter, whereas when one bloom filter is generated for each group, the hash of each member may be used as the input of the bloom filter.

Here, in the procedure at step S252, in order to compare a previous (old) bloom filter and a new bloom filter in the same group with each other, a bitwise AND operation between the two filters may be performed, whether all bits in a resultant value are '1' may be determined at step S253. When all bits of the resultant value are '1', it may be determined that there is no change in any member in the group at step S254.

Here, if it is determined at step S253 that one or more bits of the resultant value are '0', it may be determined that there is a change in any member in the group at step S255.

Next, the network environment synchronization method according to the embodiment of the present invention may identify the changed member at step S170.

That is, at step S170, the changed member may be identified depending on the result of determining whether any member in the group has changed at step S150.

Furthermore, the network environment synchronization method according to the embodiment of the present invention may update the changed content in the hash table at step S180.

That is, at step S180, the data of the management structure may be updated with the newly collected data when it is determined whether any data of the management structure has changed.

Here, at step S180, a portion in which a change has occurred may be found, and the changed member in the group may be detected first so as to revise only the corresponding portion.

Here, at step S180, a pair of nodes in which a change has occurred may be identified by utilizing the difference list based on the hash tree discriminator (index) generated by the data discriminator generator 200.

Here, at step S180, a hash table may be updated based on the list of the identified node pair.

Here, at step S180, when data is updated using the bloom filters, whether a member in a new group is included in an existing group may be determined through a search using the bloom filters.

In this case, at step S180, a list of addition members determined not to be present in the existing group may be generated using the characteristic of the bloom filters in which false negatives do not occur.

At step S180, whether a member of an existing group is present in the bloom filter for the new group may be determined through a search so as to delete a member that is not present in the new group, and the corresponding member may be maintained in a deletion member list.

Here, at step S180, the hash table may be updated using the identified addition member list and the deletion member list.

At step S180, a virtual environment may be constructed or updated using the collected data.

Here, at step S180, the member to be updated in the existing virtual network environment may be reconfigured using the update list generated by the data update unit 400 and the hash table.

In this case, the hash table, which has hashes for members as identifiers, may be stored as data about the members.

Figure 9:
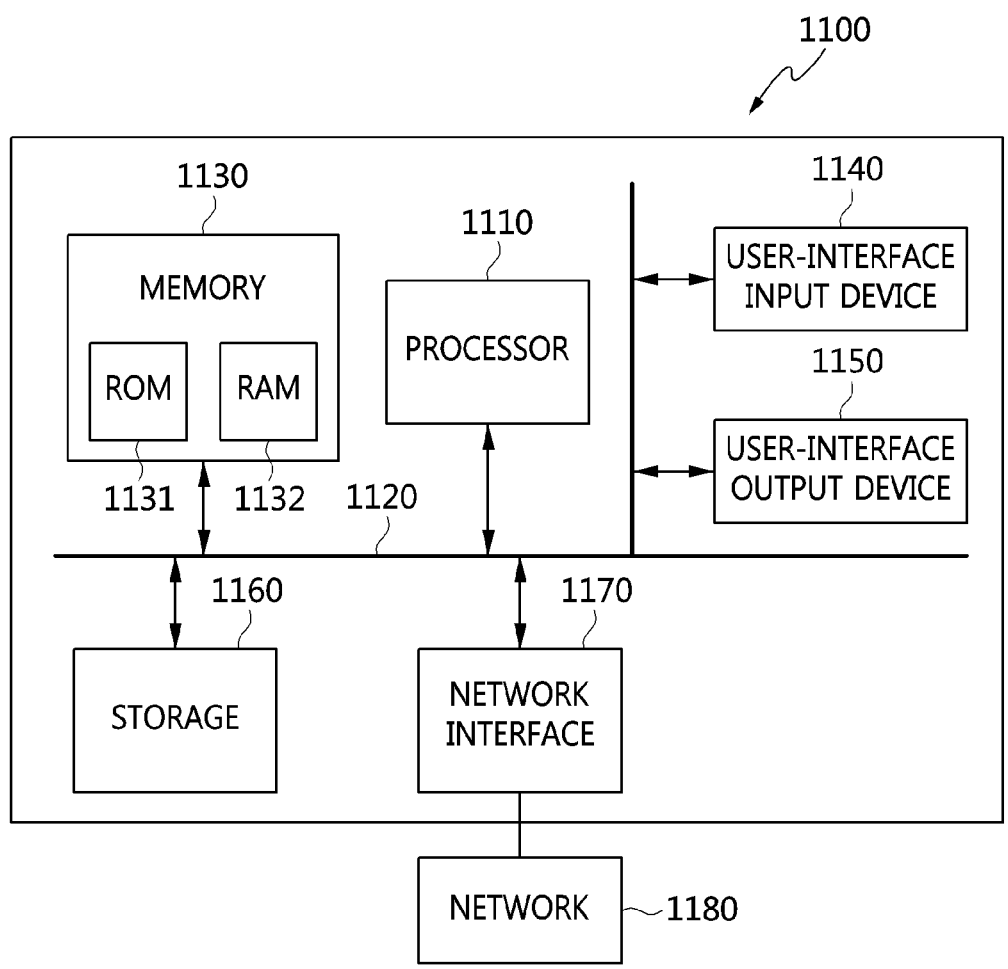
FIG. 9 is a block diagram illustrating a computer system according to an embodiment of the present invention.

FIG. 9 is a diagram illustrating a computer system according to an embodiment of the present invention.

Referring to FIG. 9, a network environment synchronization apparatus according to an embodiment of the present invention may be implemented in a computer system 1100, such as a computer-readable storage medium. As illustrated in FIG. 9, the computer system 1100 may include one or more processors 1110, memory 1130, a user interface input device 1140, a user interface output device 1150, and storage 1160, which communicate with each other through a bus 1120. The computer system 1100 may further include a network interface 1170 connected to a network 1180. Each processor 1110 may be a Central Processing Unit (CPU) or a semiconductor device for executing processing instructions stored in the memory 1130 or the storage 1160. Each of the memory 1130 and the storage 1160 may be any of various types of volatile or nonvolatile storage media. For example, the memory 1130 may include Read-Only Memory (ROM) 1131 or Random Access Memory (RAM) 1132.

The network environment synchronization apparatus according to an embodiment of the present invention may include one or more processors 1110, and execution memory 1130 for storing at least one program that is executed by the one or more processors 1110, wherein the at least one program may be configured to collect data from a network environment and generate a management structure in which collected data is distributed into preset respective group units, generate data discriminators for respective group units using a preset hash function, determine whether data of the management structure has changed with reference to data newly collected from the network environment based on the data discriminators, and when it is determined whether data of the management structure has changed, update the data in the management structure with the newly collected data.

Here, the at least one program may be configured to generate the management structure into a hierarchical tree structure that is hierarchically organized depending on a preset parent-child relationship for respective group units.

Here, the at least one program may be configured to hierarchically organize parent-child relationships between hashes generated for respective group units depending on the hierarchical tree structure.

Here, the at least one program may be configured to generate a hash chain using hashes generated from pieces of data for respective group units, and generate the data discriminators from the hash chain.

Here, the at least one program may be configured to generate a data discriminator of the newly collected data, compare hashes of a data discriminator of the management structure corresponding to the data discriminator of the newly collected data with hashes of the data discriminator of the newly collected data with regard to whether the hashes match each other, and then determine whether the data of the management structure has changed.

Here, the at least one program may be configured to compare the hashes included in the data discriminator of the newly collected data with the hashes included in the data discriminator of the management structure with regard to whether the hashes match each other, using a depth-first-search technique depending on the hierarchical tree structure.

Here, the at least one program may be configured to generate a first bloom filter for the hashes included in the data discriminator of the newly collected data, generate a second bloom filter for the hashes included in the data discriminator of the management structure, and determine whether the data of the management structure has changed by comparing the first bloom filter with the second bloom filter.

The network environment synchronization apparatus and method for the present invention according to embodiments of the present invention may provide a method for efficiently synchronizing an actual network environment with a virtual network environment by detecting and updating only a changed portion, rather than reconfiguring the entirety of a previously constructed virtual network environment when a network environment dynamically changes through the above-described procedure.

Also, the network environment synchronization apparatus and method for the present invention according to embodiments of the present invention may provide a function of determining a change between previously collected data and newly collected data and identifying a portion in which the change has occurred.

The present invention may efficiently synchronize a virtual network environment with an actual network environment when configuring a virtual network environment using data collected in the actual network environment.

Further, the present invention may identify a difference between an existing network environment and a current network environment, promptly detect a change occurring on the network, check the trend in the change, and then provide assistance in security control.

As described above, in the network environment synchronization apparatus and method according to the present invention, the configurations and schemes in the above-described embodiments are not limitedly applied, and some or all of the above embodiments can be selectively combined and configured so that various modifications are possible.

What is claimed is:

1. A network environment synchronization apparatus, comprising:
   one or more processors; and
   an execution memory for storing at least one program that is executed by the one or more processors,
   wherein the at least one program is configured to:
   collect data from a network environment and generate a management structure as a hierarchical tree structure in which collected data is distributed into preset respective group units, the hierarchical tree structure being hierarchically organized depending on a preset parent-child relationship for the respective group units,
   generate data discriminators for respective group units using a preset hash function,
   generate a data discriminator for newly collected data,
   determine whether there is a data discriminator identical to the generated data discriminator for the newly collected data present among data discriminators of previously collected data,
   store the newly collected data when there is no data discriminator identical to the generated data discriminator for the newly collected data present among the data discriminators of the previously collected data,
   determine whether data of the management structure has changed with reference to the data newly collected from the network environment based on the data discriminators when there is a data discriminator identical to the generated data discriminator for the newly collected data present among the data discriminators of the previously collected data, by comparing hashes of data discriminators in the management structure corresponding to the data discriminator of the newly collected data with hashes of the data discriminator of the newly collected data, with regard to whether the hashes match each other, using a Depth-First-Search (DFS) technique depending on the hierarchical tree structure,
   wherein the comparing the hashes includes generating a first bloom filter for the hashes included in the data discriminator of the newly collected data, generating a second bloom filter for the hashes included in the data discriminators of the management structure, and determining whether the data of the management structure has changed by comparing the first bloom filter with the second bloom filter, and
   based on the comparing the first bloom filter with the second bloom filter, update the data of the management structure with the newly collected data in response to determining that any data of the management structure has changed.

2. The network environment synchronization apparatus of claim 1, wherein the at least one program is configured to hierarchically organize parent-child relationships between hashes generated for respective group units depending on the hierarchical tree structure.

3. The network environment synchronization apparatus of claim 2, wherein the at least one program is configured to generate a hash chain using hashes generated from pieces of data for respective group units, and generate the data discriminators from the hash chain.

4. A network environment synchronization method performed by a network environment synchronization apparatus, the network environment synchronization method comprising:

collecting data from a network environment and generating a management structure as a hierarchical tree structure in which collected data is distributed into preset respective group units, the hierarchical tree structure being hierarchically organized depending on a preset parent-child relationship for the respective group units, generating data discriminators for respective group units using a preset hash function, generating a data discriminator for newly collected data, determining whether there is a data discriminator identical to the generated data discriminator for the newly collected data present among data discriminators of previously collected data, storing the newly collected data when there is no data discriminator identical to the generated data discriminator for the newly collected data present among the data discriminators of the previously collected data, determining whether data of the management structure has changed with reference to the data newly collected from the network environment based on the data discriminators when there is a data discriminator identical to the generated data discriminator for the newly collected data present among the data discriminators of the previously collected data, by comparing hashes of data discriminators in the management structure corresponding to the data discriminator of the newly collected data with hashes of the data discriminator of the newly collected data, with regard to whether the hashes match each other, using a Depth-First-Search (DFS) technique depending on the hierarchical tree structure, wherein the comparing the hashes includes generating a first bloom filter for the hashes included in the data discriminator of the newly collected data, generating a second bloom filter for the hashes included in the data discriminators of the management structure, and determining whether the data of the management structure has changed by comparing the first bloom filter with the second bloom filter, and based on the comparing the first bloom filter with the second bloom filter, updating the data of the management structure with the newly collected data in response to determining that any data of the management structure has changed.

5. The network environment synchronization method of claim 4, wherein generating the data discriminators comprises:

hierarchically organizing a parent-child relationship between hashes generated for respective group units depending on the hierarchical tree structure.

6. The network environment synchronization method of claim 5, wherein generating the data discriminators further comprises:

generating a hash chain using hashes generated from pieces of data for respective group units, and generating the data discriminators from the hash chain.

7. The network environment synchronization method of claim 4, further comprising:

based on detecting a change occurring in the network environment, checking a trend in the change, and providing assistance in security control.

* * * * *